Patented Oct. 28, 1924.

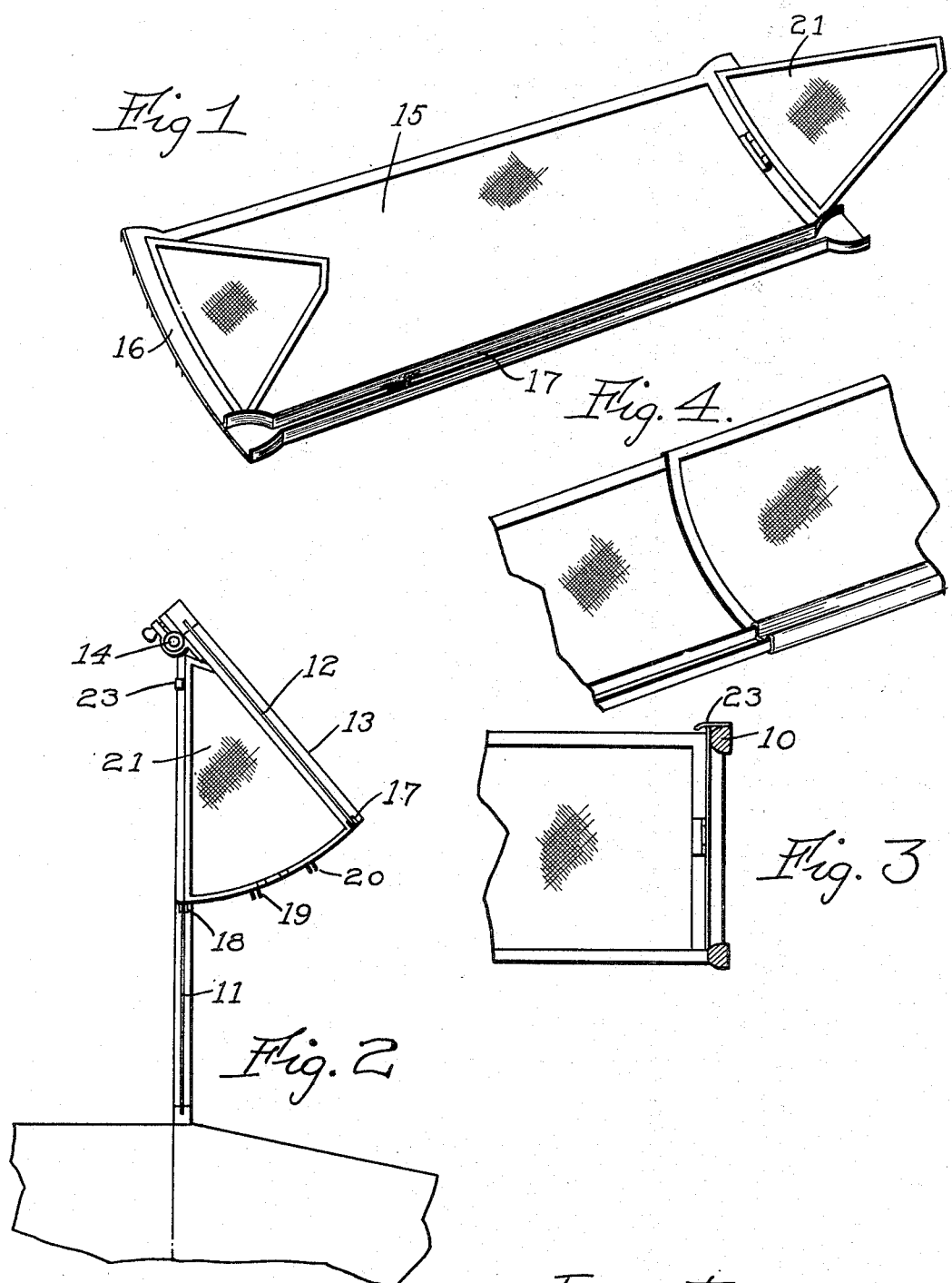

1,513,123

UNITED STATES PATENT OFFICE.

DANIEL O'CONNELL, OF WORCESTER, MASSACHUSETTS.

WINDSHIELD SCREEN FOR AUTOMOBILES.

Application filed July 10, 1923. Serial No. 650,679.

*To all whom it may concern:*

Be it known that I, DANIEL O'CONNELL, a citizen of the United States, residing at Worcester, in the county of Worcester and State of Massachusetts, have invented new and useful Windshield Screens for Automobiles, of which the following is a specification.

This invention relates to an attachment for use in automobiles when driving with the wind shield partially open. Under these conditions much annoyance is frequently caused by entrance of dust, rain and insects between the edges of the upper and lower portions of the windshield.

It is the object of my invention to provide an improved screen which may be readily placed in position when the wind shield is opened and which will effectively exclude dust, rain and insects, particularly when the car is in motion.

My improved screen is also effective as a glare protector, as approaching head-lights when viewed through the screen lose much of their dazzling effect.

A further object of my invention is to provide a screen which may be applied to a wind shield which is either fully or partly open and which will be securely held in place in either position of the wind shield.

I also provide end or wing portions which fill the triangular spaces at the ends of the open wind shield and which also assist in securing the screen in position.

My invention further relates to arrangements and combinations of parts which will be hereinafter described and more particularly pointed out in the appended claims.

A preferred form of the invention is shown in the drawings in which—

Fig. 1 is a perspective view of my improved wind shield screen;

Fig. 2 is a side elevation of a wind shield with my improved screen attached thereto;

Fig. 3 is a detail sectional view showing the means for holding the end or wing portions in position; and Fig. 4 is a detail view of a slight modification.

Referring to the drawings, I have indicated a portion of an automobile wind shield comprising an enclosing casing 10, a lower and commonly fixed glass 11, and an upper glass 12 mounted in a swinging frame 13 which is pivoted at 14 to the upper portion of the casing 10. The upper glass 12 may be swung outward or toward the front of the car as indicated in Fig. 2.

My improved wind shield screen comprises a sheet 15 of wire cloth or similar mesh fabric, mounted in a frame 16 which encloses the fabric on all four sides. A grooved member 17 is secured to one edge portion of the fabric frame on the upper face thereof and a similar grooved member 18 (Fig. 2) is secured on the lower face of the frame 16 along the opposite edge portion thereof. The ends of the grooved members 17 and 18 may be spread apart as indicated in Fig. 1 to receive the side portions of the casing 10 and swinging frame 13. Additional short grooved members 19 and 20 are fixed to the under side of the end portions of the frame 16 as indicated in Fig. 2.

Substantially triangular end members or wings 21 are pivoted at 22 to the end portions of the frame 16 and are adapted to be swung upward to fill the triangular spaces at the ends of the glass 12 when the glass is swung outward to the position shown in Fig. 2. Spring clips 23 (Fig. 3) are fixed to the wind shield casing 10 and snap around the edges of the wing members 21 as they are swung upward, holding them securely in raised position.

When placing the screen in position after the wind shield is opened, the grooved members 17 and 18 are first fitted over the adjacent edges of the upper and lower wind shield glass portions 12 and 11. The end wings 21 are then swung upward and are held in position by the clips 23. The wings 21 prevent upward swinging movement of the screen about the edge of the glass 12 and also prevent downward swinging movement about the edge of the glass 11. The screen is thus firmly secured in position and cannot be accidentally displaced, even when travelling extremely rough roads.

If the glass 12 is only partially open, the grooved members 19 and 20 may be fitted over the upper edge of the lower glass 11, thus holding the screen in position but with a less opening of the wind shield.

As previously stated, my improved screen not only effectively excludes dust and insects but is also found to prevent the entrance of driving rain through the wind shield opening and also breaks up the glare of approaching head-lights, all of which results greatly increase the safety of driving, especially at night and where much traffic is encountered.

In Fig. 4, I have shown a modification in which the screen frame is made in telescoping parts, so that the same screen may be readily adjusted to fit wind shields of different widths.

Having thus described my invention and the advantages thereof, I do not wish to be limited to the details herein disclosed otherwise than as set forth in the claims, but what I claim is:—

1. A screen for a two-part automobile wind shield comprising an elongated sheet of screen fabric, a substantially rigid frame for said fabric, and grooved members disposed along opposite edges of said frame and fitting the adjacent upper and lower edges of the wind shield sections, said grooved members forming the entire support of said frame and screen along the longitudinal edges thereof.

2. A screen for a two-part automobile wind shield comprising an elongated sheet of screen fabric, a substantially rigid frame for said fabric, a grooved member secured along one edge of said frame and fitting the lower edge of the upper portion of said wind shield, a second grooved member secured along the opposite edge of said frame and fitting the upper edge of the lower portion of said wind shield, said grooved members forming the entire support for said frame and screen along the longitudinal edges thereof, and additional positioning devices mounted on the end portions of said frame and effective to determine intermediate positions of said screen relative to said wind shield sections.

3. A screen for a sectional automobile wind shield comprising an elongated sheet of screen fabric, a substantially rigid frame for said fabric, grooved members disposed along the longitudinal edges of said frame and fitting adjacent upper and lower edges of the wind shield sections, said grooved members forming the entire support for said frame along its longitudinal edges, upwardly extending end members mounted on said frame and filling the openings above the ends of said screen, and means to hold said end members in position.

In testimony whereof I have hereunto affixed my signature.

DANIEL O'CONNELL.